United States Patent

Johnson

[15] 3,641,738
[45] Feb. 15, 1972

[54] ORCHARD PRUNING AND PICKING APPARATUS

[72] Inventor: Roy W. Johnson, P.O. Box 115, Woodland, Calif. 95696

[22] Filed: Jan. 19, 1970

[21] Appl. No.: 3,714

[52] U.S. Cl. ............................53/391, 182/131, 182/132, 182/141, 214/83.1
[51] Int. Cl. .....................................B65b 67/02, B60p 1/36
[58] Field of Search ..............53/59, 248, 390, 391; 56/328, 56/340; 182/63, 129, 131, 132, 141, 148; 214/83.1, 83.14, 83.26

[56] References Cited

UNITED STATES PATENTS

| | | | |
|---|---|---|---|
| 2,798,623 | 7/1957 | Girardi | 214/83.1 |
| 2,953,229 | 9/1960 | Wiegel | 182/63 X |
| 3,236,393 | 2/1966 | Girardi | 214/83.1 X |
| 3,437,174 | 4/1969 | Coblentz | 182/131 X |
| 3,523,404 | 8/1970 | Girardi | 53/391 |
| 3,529,696 | 9/1970 | Jacobsen | 182/129 |
| 3,537,236 | 11/1970 | Fridley | 53/391 |

*Primary Examiner*—Robert L. Spruill
*Attorney*—Townsend and Townsend

[57] ABSTRACT

An agricultural implement for use when pruning or trimming orchard trees, or when picking fruits, which has a wheel mounted frame for movement between rows of orchard trees and that includes a hold for a fruit crate. The frame mounts a plurality of work platforms on each side of the frame for lateral movement of the platforms toward and away from the frame. Power-driven fruit transport means move the fruit from the platforms to a central gathering belt mounted to the frame for discharge of the fruit into the crate. A fruit decelerator between the discharge end of the gathering belt and the crate significantly reduces the vertical speed of the fruit as it moves through the decelerator to prevent high-speed impacts and resulting damage to the fruit. Means are provided for raising and lowering at least some of the work platforms to enable the use of the implement on relatively tall trees, to facilitate the transport of the implement on public highways and to reduce the required storage room.

14 Claims, 15 Drawing Figures

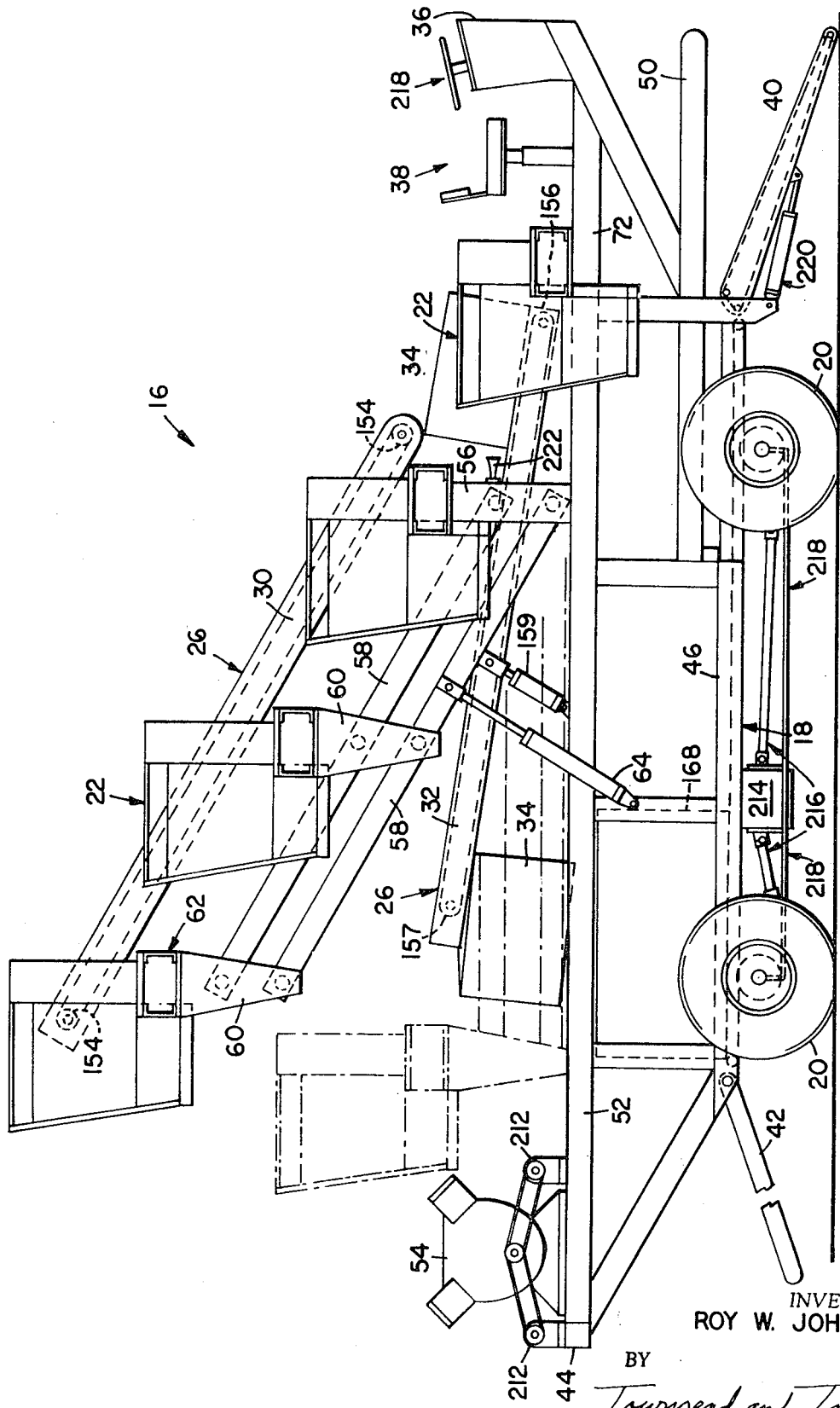

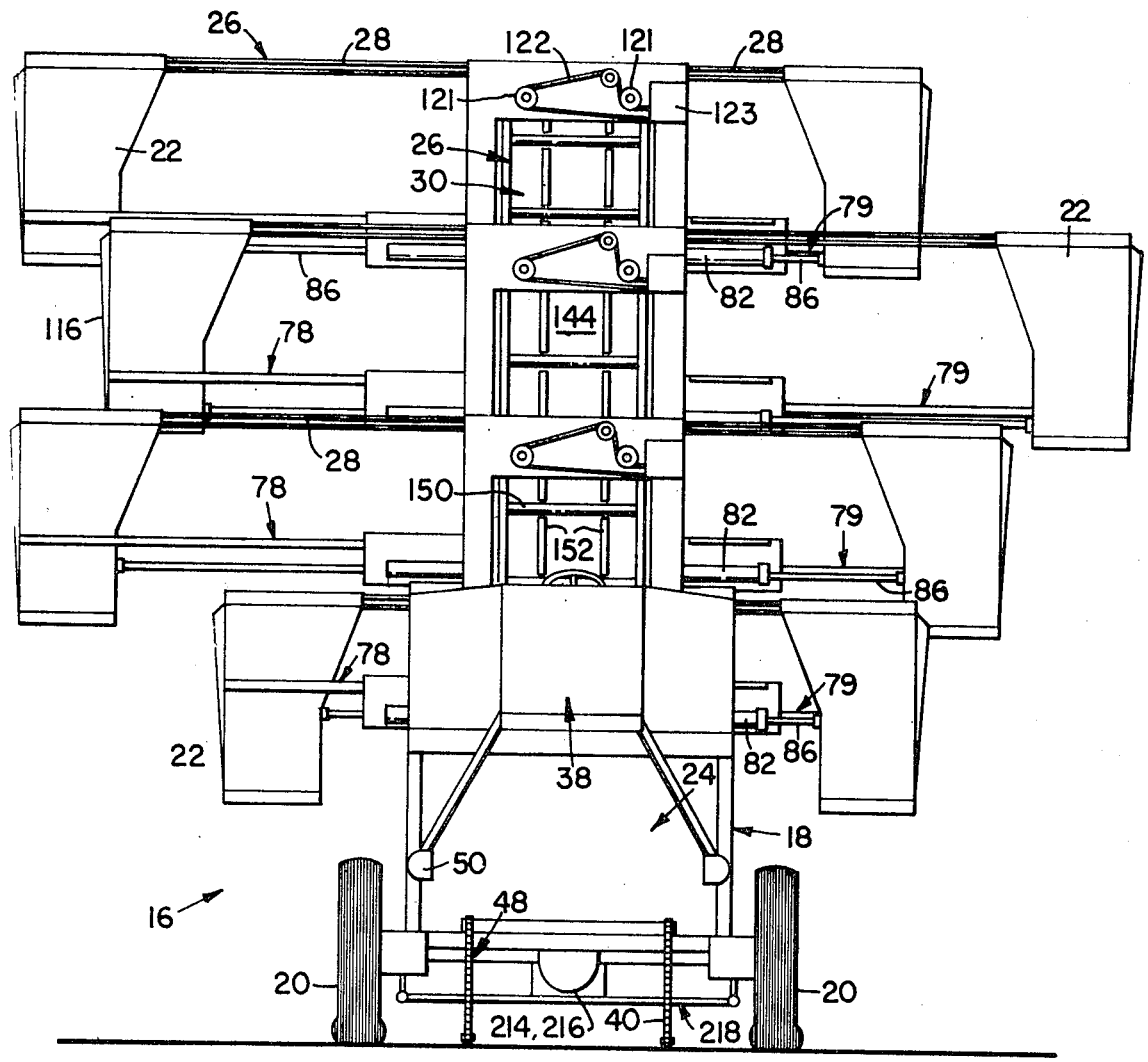
FIG_2

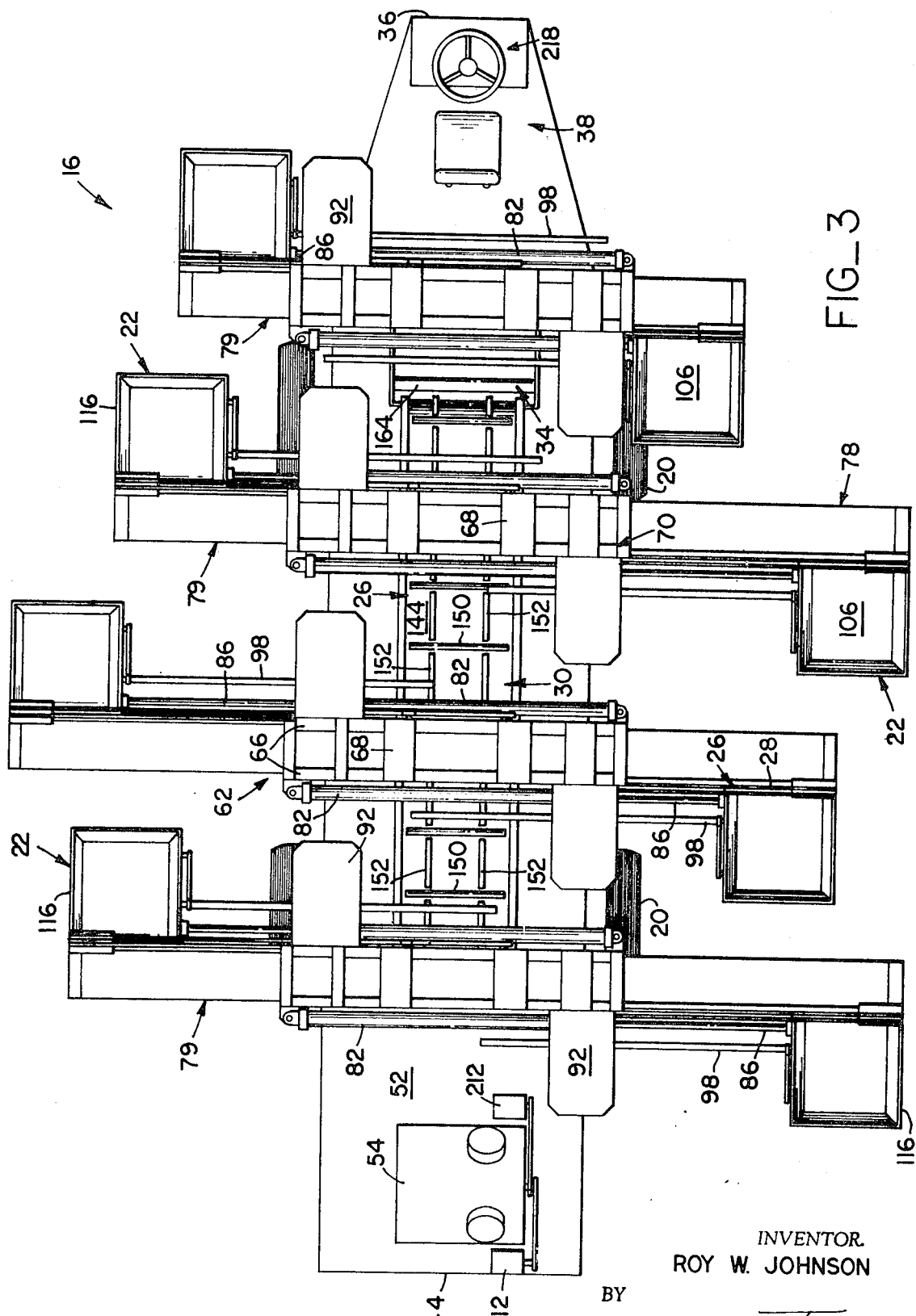
FIG_3

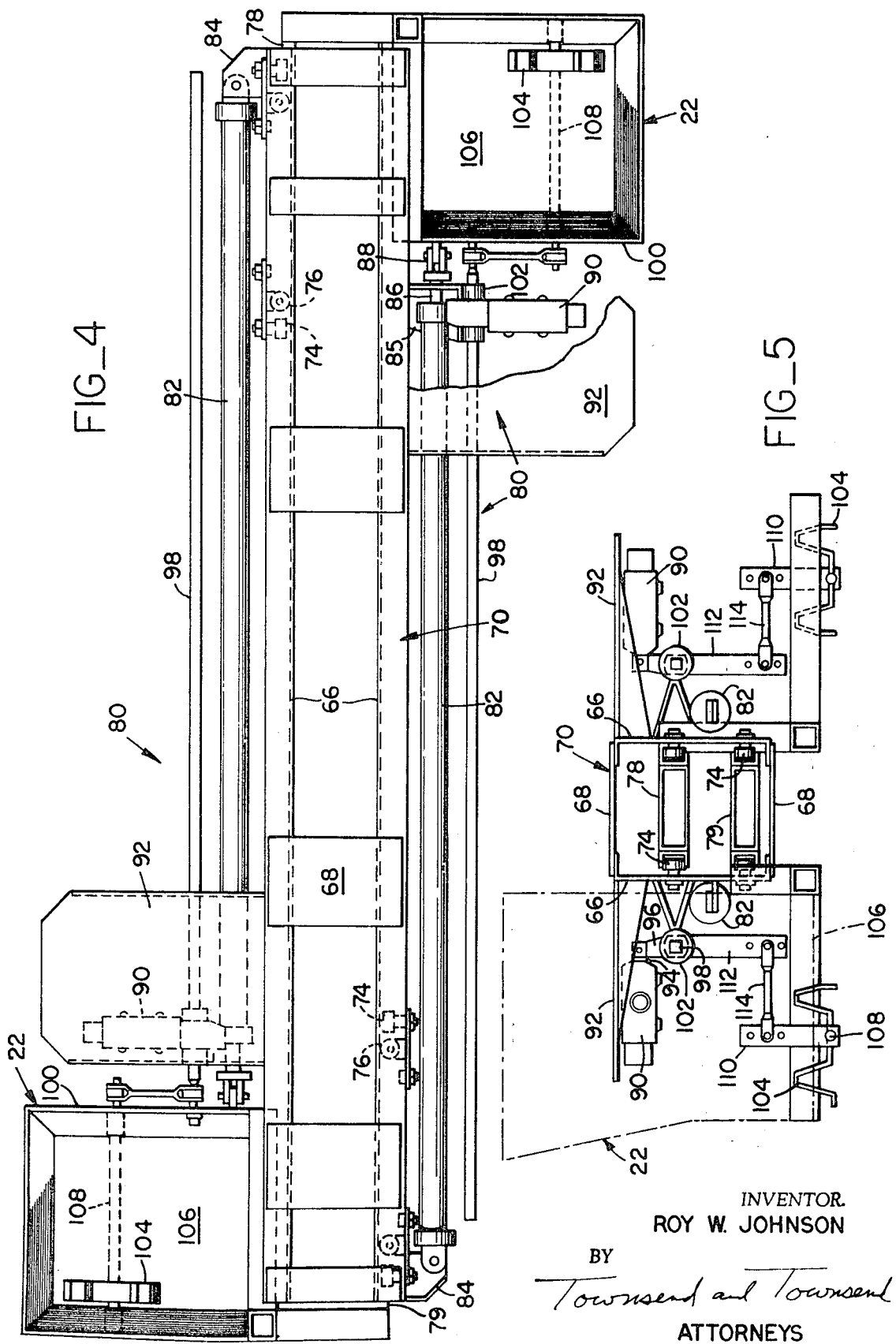

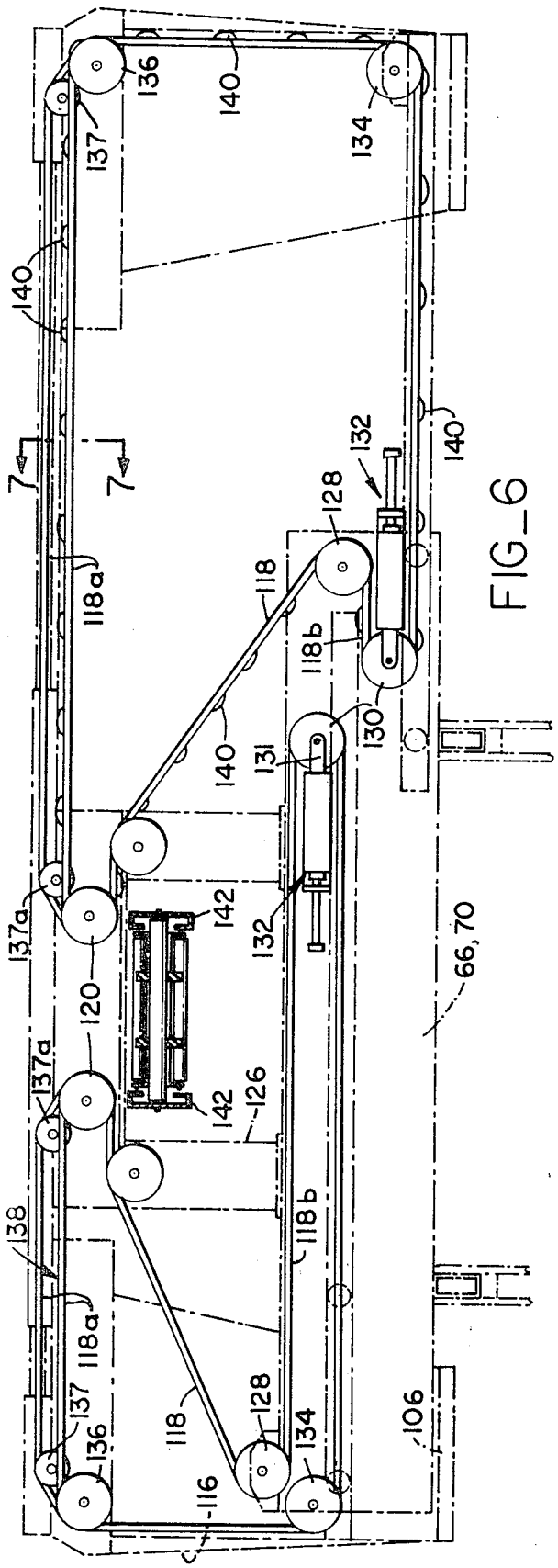
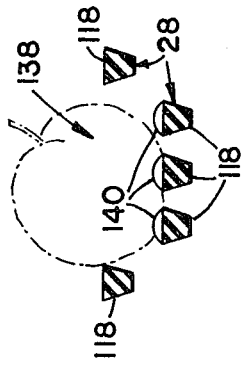
FIG_7
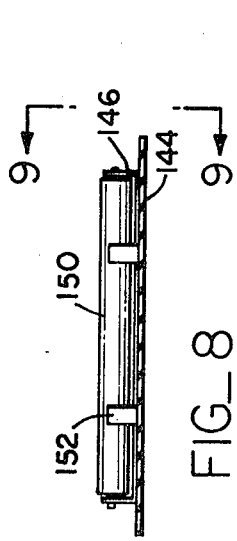
FIG_8
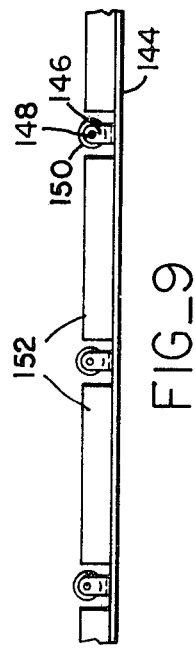
FIG_9
INVENTOR.
ROY W. JOHNSON
BY
Townsend and Townsend
ATTORNEYS PATENTED FEB 15 1972 3,641,738
SHEET 6 OF 6
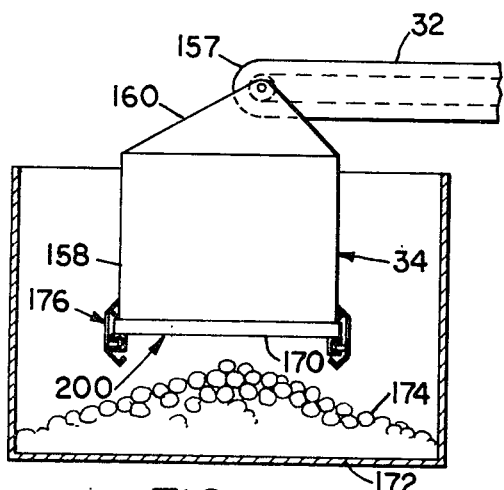
FIG_10
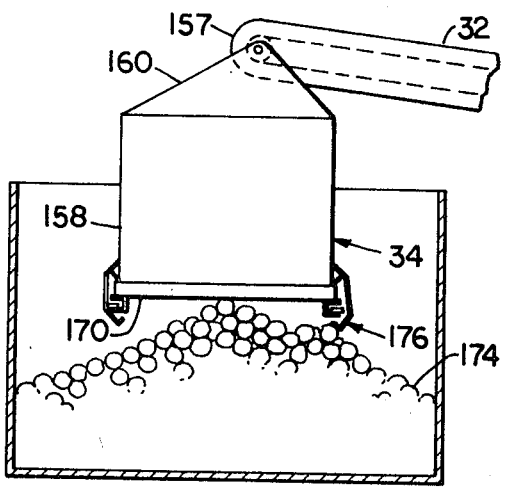
FIG_11
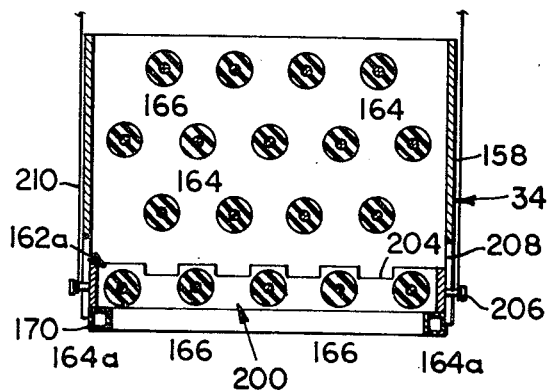
FIG_12
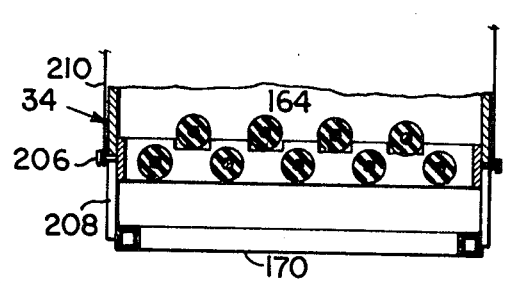
FIG_13
FIG_14
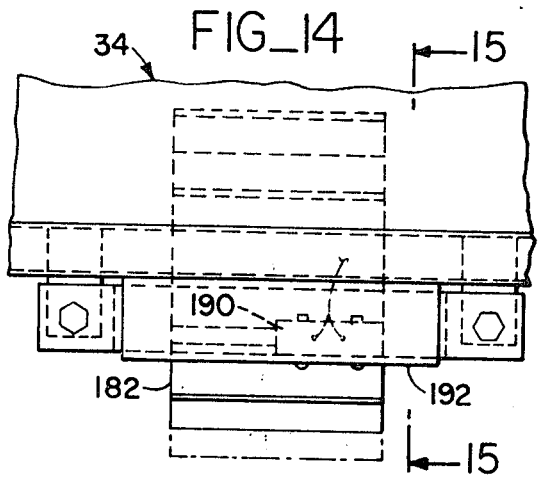
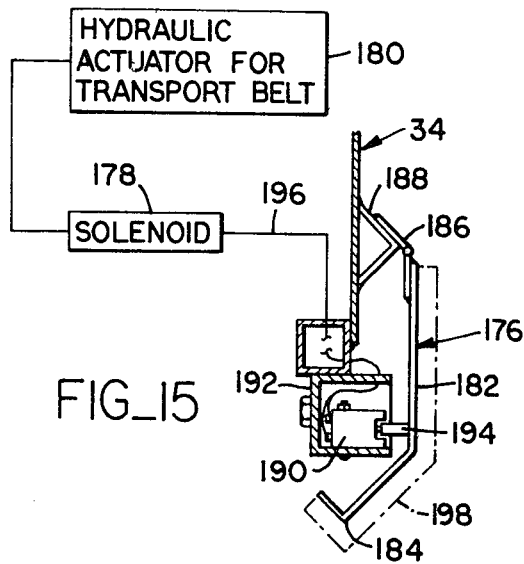
FIG_15
INVENTOR.
ROY W. JOHNSON
BY
*Townsend and Townsend*
ATTORNEYS

ORCHARD PRUNING AND PICKING APPARATUS

BACKGROUND OF THE INVENTION

Until recently, fruit, such as apples, pears, peaches, oranges and the like, have been hand picked by pickers who employed ladders placed against the fruit-bearing trees. The picking of the fruit in this manner is time consuming, is hard and often dangerous physical labor and is the source of a substantial portion of the price of fruit.

Attempts have been undercarriage to mechanize or at least to speed up the fruit-picking operation. One suggested solution provided the use of so-called "cherry pickers." Cherry pickers employ universally movable buckets mounted to the free end of a hydraulically actuated, universally movable boom supported by an undercarriage such as a truck. In this manner, each person can move up and down and towards and away from the trees and pick fruit without the need for frequent repositioning of ladders. In addition, fruit and limb damage from heavy ladders, rough handling and the like is substantially reduced or eliminated. A serious drawback of cherry pickers, however, is their great cost. As a result of their high cost cherry pickers are only sparingly used for the picking of fruit.

More recently, so-called orchard scaffolds have become known. Such scaffolds employ a plurality of vertically staggered working platforms mounted to a movable frame for lateral movement towards and away from the fruit trees. The scaffold is drawn between adjacent orchard tree rows and fruit is picked by workmen standing on the platforms. The fruit is then transported to a fruit collection point such as a crate carried by the frame.

The scaffold eliminates the need for ladders, their frequent repositioning and their climbing to reach the fruit and then to deposit it in suitable crates. It, therefore, permits a substantial speedup in the picking of fruit which results in corresponding time savings and cost reductions. Moreover, such orchard scaffolds can be constructed at a per worker cost which is substantially less than the per worker cost of cherry pickers.

However, such prior art scaffolds are relatively bulky and difficult to handle. Working platforms are frequently elongate and so large that they can only be placed against the exterior of the tree without providing access to the interior of the tree. Moreover, such scaffolds provide handling facilities for the picked fruit which subjects such fruit to damaging impact forces from relatively long free falls, or from a large number of successive free falls of lesser height, to lower the fruit from the point of picking to the fruit receiving crate. Such gravitational lowering of the fruit causes a decrease in its quality, a corresponding decrease in the obtainable price, and thus lessens profits. Moreover, prior art orchard scaffolds are mere movable frames that must be directed and drawn by independent draw vehicles such as tractors. Since adverse, e.g., soft or muddy soil conditions from rain or irrigation substantially lessen the control over the drawn scaffold, it can move sideways into the adjacent orchard tree row, damage the trees and fruit and become a danger to the workmen on the scaffold. Lastly, prior art scaffolds provide insufficient means to handle the heavy filled fruit crates so that the scaffold must either be stopped for handling the crates of the crates must be handled before they are fully filled. Either alternative is wasteful.

SUMMARY OF THE INVENTION

The present invention provides apparatus for the high speed, low cost picking of fruit from trees. It is further adapted for use in trimming, pruning or otherwise working on the trees.

Broadly speaking, the present invention provides an agricultural implement comprising a self-propelled vehicle for movement past orchard trees. A plurality of independent working stands are mounted to the vehicle for lateral movement in a direction transverse to the direction of movement of the vehicle to thereby bring the working stands in close proximity with various portions of the orchard trees. The stands are staggered along sides of the vehicle and at least one of the stands is movable in a vertical direction to facilitate the transportation and storage of the implement by lowering the working stand.

Each stand provides support for a single workman and it is sufficiently small to permit it to pass between major limbs of the tree so that the workman can pick fruit growing on the interior portions of the tree.

In the presently preferred form of the invention, the vehicle is defined by a wheel mounted frame that includes a hold for supporting a fruit receiving crate. The implement includes power driven fruit transport means comprising a plurality of substantially horizontally disposed endless transport belts arranged to form a moving trough between each working stand and a gathering belt mounted to the frame at the center thereof. Both belts are constructed to prevent fruit from rolling therefrom sideways and from rolling along the belt under gravity so that the relative speed of the fruit is controlled. Sudden deceleration of the fruit after long free falls, or large members of shorter free falls, which can damage the fruit, are thereby prevented. The gathering belt terminates at a discharge end placed over the fruit receiving crate. A fruit decelerator is placed between the discharge end and the crate so that gravity moves the fruit through the decelerator at a sufficiently low speed to prevent damage to the fruit. The decelerator includes sensor means for incrementally raising the decelerator in response to a rise in the fruit level in the crate until the crate is filled. Preferably, it also includes means for temporarily preventing fruit to pass through the decelerator while a full crate is removed from the implement and replaced with a new, empty crate.

The implement is preferably provided with a single power source, namely a motor driven hydraulic pump that actuates a hydraulic four-wheel power drive for the implement as well as the fruit transport means and which also actuates the lateral motions of the work stands and the means for moving the crates onto and off the vehicle. This provides a relatively low cost power source for the various moving components of the implement. The four-wheel drive and steering mechanism facilitates the controlled movement of the vehicle irrespective of soil conditions and terrain to prevent accidental harm to operating personnel or damage to the implement or surrounding trees.

The farming implement of the present invention substantially increases the use of orchard scaffolds since it provides a virtually damage-free fruit-transporting system between the working stands and the fruit crate. Moreover, when not in use, the overall size of the implement is substantially reduced to lower storage costs and enable the transportation of the implement on public highways without exceeding height and width limitations that would require special transportation permits and limit the times during which such implement can be moved.

The speed with which the implement of the present invention enables the picking of fruit is increased over that possible in the prior art since the picker can direct his full attention to the picking of the fruit. The fruit transport means are so positioned that the picker can conveniently place the fruit thereon from the working stand without the need for turning, twisting or bending to reach the fruit transport means. Moreover, the present invention provides a power-driven crate-handling mechanism that allows the complete filling of even large crates such as used by industrial consumers without necessary handling difficulties to thereby reduce crate handling costs.

Thus, the present invention, while providing apparatus with relatively low unit costs per workman, provides a high-speed fruit-picking apparatus which substantially eliminates fruit damage during the picking operation and while the fruit is placed in crates. From between 40 percent to 60 percent of the picking costs can thereby be saved. Similar savings are experienced when the implement is used for the trimming and/or pruning of trees so that the implement of the present invention affords substantial overall cost reductions in the operation of fruit orchards.

BRIEF DESCRIPTION OF THE DRAWINGS

FIG. 1 is a side elevational view of a farming implement constructed in accordance with the present invention, with some parts deleted for clarity, and shows, in phantom lines, the position of working platforms during the storage and transportation of the implement;

FIG. 2 is a front elevational view of the implement illustrated in FIG. 1 and shows the working platforms at various extended positions;

FIG. 3 is a plan view, with parts broken away and/or deleted for clarity, of the implement illustrated in FIG. 2;

FIG. 4 is a fragmentary, enlarged plan view of the connection of a pair of working platforms to the supporting frame, and further illustrates means for expanding and retracting the platforms;

FIG. 5 is a side elevational view of the connection of the working platform to the supporting frame illustrated in FIG. 4;

FIG. 6 is a schematic front elevational view of transport belts mounted and arranged for movement of picked fruit from the working platforms to a central gathering belt and, for clarity, shows the platform and supporting structures in phantom lines;

FIG. 7 is a side elevational view, in section, of a moving trough formed by the transport belts illustrated in FIG. 6 and is taken on line 7—7 of FIG. 6;

FIG. 8 is a front elevational view, in section, of a gathering belt only illustrated in FIGS. 3 and 6;

FIG. 9 is a side elevational view of the gathering belt illustrated in FIG. 8 and is taken on line 9—9 of FIG. 8;

FIG. 10 is an elevational view, partially in section, of a fruit decelerator receiving fruit from the gathering belt and transmitting such fruit into a fruit crate;

FIG. 11 is a view similar to FIG. 10, illustrates the decelerator in a raised position and shows the operation of a sensor detecting the fruit level in the crate;

FIG. 12 is an enlarged side elevational view, in section, of the fruit decelerator illustrated in FIGS. 10 and 11 and shows one layer of deceleration bars mounted on a movable frame;

FIG. 13 is a view similar to FIG. 12 but shows the movable frame in a raised position so as to prevent movement of fruit through the decelerator;

FIG. 14 is a side elevational view of the lower end of a fruit decelerator and illustrates the fruit level sensor in greater detail; and FIG. 15 is a side elevational, sectional view of the fruit level sensor and is taken on line 15—15 of FIG. 14.

DESCRIPTION OF THE PREFERRED EMBODIMENTS

Referring to FIGS. 1 through 3, a fruit-picking and tree-pruning apparatus or implement 16 comprises a vehicle frame 18 mounted on wheels 20 for movement over the ground and includes a plurality of laterally movable working stands or platforms 22 which are distributed over the length of the frame on both sides thereof (see FIGS. 2 and 3). Each working stand provides sufficient room to support one workman. Thus, they are relatively narrow in the direction of travel of the implement and extend only about two feet in that direction to enable their extension into the interior of a tree past the major tree limbs.

The frame defines a hold 24 for receiving fruit crates (not shown in FIGs. 1 through 3) and the like and transport means 26 for transporting picked fruit from the working platforms via substantially horizontal transport means 28 disposed between the working platforms and the frame, first and second gathering belts 30, 32 and vertical fruit decelerators 34 into a fruit receiving crate. A forward end 36 of the implement includes a control stand 38 for an operator that is provided with controls (not separately shown) for moving and steering the vehicle as well as for controlling and energizing the various moving components of the implement.

Frame 18 pivotally mounts a forward ramp 40 and a ramp 42 at an aft end 34 of the implement. Between the two ramps, the frame defines the above-referred to hold 24 (best seen in FIG. 2) for movement of crates up forward ramp 40, along intermediate horizontal members 46 of the frame and down aft ramp 42. To facilitate the ease and speed of moving the crates, it is presently preferred to provide schematically illustrated, power driven chain conveyors, at least on forward ramp 40 and horizontal frame members 46. The conveyors include suitable detents for engaging the crate and transporting it up the forward ramp and through hold 24 over the length of the frame.

The forward end of frame 18 also includes forwardly extending guide bars 50 which guide crates moving up forward ramp 40 and prevent a wedging of the crates as they enter hold 24. Frame 18 further defines a platform 52 at the aft end of the implement for suitably mounting a motor 54.

The forward portion of frame 18 is further provided with a pair of spaced-apart upright posts 56 on each side of the frame. Each upright post pivotally mounts in an opposing relation a pair of parallel, upwardly extending bars 58 which are suitably connected at their aft ends and at an intermediate point by opposing plates 60 which permit simultaneous movement of the bars and further mount means 62 for laterally movably supporting working platforms 22 as more fully described hereinafter. A hydraulic actuator 64 is connected to frame 18 and the lower one of bars 58, respectively, for pivotally moving the bars between a lower, storage position (illustrated in phantom lines in FIG. 1) and an inclined working position (illustrated in solid lines in FIG. 1).

Referring now to FIGS. 1 through 5, a pair of opposing channels 66 is mounted to each pair of opposing plates 60 secured to bars 58 in mutual alignment. The channels extend past the bars and, on the upper side, are interconnected by gusset plates 68 which are welded or otherwise fastened to the channels, so that the channels define transversely extending box members 70 that are movable with bars 58 while they maintain their vertical orientation. A pair of stationary box members are further secured to upright posts 56 and a horizontal top member 72 of frame 18. The relative elevation of the forwardmost, stationary box member is selected so that the elevation between adjacent box members differs by about like amounts when bars 58 are in their inclined positions.

Referring particularly to FIGS. 4 and 5, a plurality of cam followers 74 are secured to channels 66 at vertically spaced-apart points and with their axes horizontally oriented. Additionally, vertically oriented cam followers 76 are provided. The cam followers engage vertically spaced pairs of horizontally movable beams 78, 79 and guide the beams for horizontal movement in a direction substantially perpendicular to the axis of the implement. A working stand 22 is mounted to one end of each movable beam. The stands are mounted on opposite sides of the beam for affixing independent hydraulic actuating means for each stand to box member 70. Thus, the working stands on one side of the implement are staggered with respect to the stands on the other side and one stand carried by a given box member faces forwardly and the other stand faces rearwardly of the implement as clearly illustrated in FIG. 3. The connection of the working stands to the free ends of the beams is conventional and therefore not further detailed herein. Thus, the working stands can be moved lateral of the vehicle as guided by movable beams 78, 79, a distance determined by the length of the beams.

Still referring to FIGS. 1 through 5, and particularly to FIGS. 4 and 5, means 80 are provided for automatically extending and retracting the working stands 22. An elongate hydraulic cylinder 82 is associated with each working stand and has one end mounted to a bracket 84 projecting from the side of the channel facing in the direction in which the corresponding working stand faces. The other end of the cylinder is secured to a second bracket 85 affixed to the adjacent channel 66. A piston rod 86 projects from the end of the cylinder mounted to bracket 85 and is suitably attached to the adjacent working stand by a coupling 88. Thus, energization of one or the other side of the piston (not separately shown) disposed in hydraulic cylinder 82 moves the piston rod and the associated working stand towards or away from the implement.

The working stand moving means also includes controls which are operated with the foot of the workman standing in the associated working stand. The controls comprise a conventional, three-way valve 90 that is mounted to the underside of a stepping plate 92 projecting horizontally from the web of each channel 66 in the direction of the adjacent working stand. A valve plunger 94 is actuated by a lever 96 having a square opening which slidably receives an elongate square bar 98. The square bar is rotatably secured to an inwardly facing side 100 of working stand 22 and is further supported by a bearing 102 affixed to bracket 85 while the free end of the square rod remains unsupported.

A foot pedal 104 extends through an opening in a floor 106 of the working stand and is mounted to a shaft 108 that is pivotally secured to the other side of the floor. An end of the shaft projects past the working stand towards the center of the implement and immovably carries an upwardly extending push arm 110 which is connected to a lever 112 affixed to square bar 98 via a connecting rod 114. Thus, actuation of the foot pedal by depressing it in the clockwise or in the counterclockwise direction, as viewed in FIG. 5, pivots square bar 98 in one or the other direction and moves valve plunger 94 to its various operating positions.

The three-way valve 90 is connected to hydraulic cylinder 82 so that the plunger movement caused by depression of the foot pedal pressurizes one or the other side of the piston disposed in the cylinder to move the piston rod and the work stand laterally outward or inward.

As is best seen in FIGS. 4 and 5, identical hydraulic actuating means is disposed on each side of box member 70 for identical operation of both working stands supported and carried by each box member. Their operation, by depressing pedal 104 in one or the other direction, is identical and leaves the hands of the workman free for picking fruit, trimming trees, or like work, even while repositioning the work stand.

Fruit picked by workman in the stands is placed onto the horizontal belt transport means 28 which originate adjacent an outermost side 116 of each work stand 22 and move the fruit towards the inclined gathering belt 30. Referring now specifically to FIGS. 2, 3, 6 and 7, the horizontal belt transport means comprises a plurality of endless transport V-belts 118 for each work stand which are looped over a pulley arrangement as follows: A drive wheel 120 disposed adjacent the center of the fruit picker and immediately above inclined gathering belt 30 is mounted on a shaft which also mounts a pulley 121 (shown in FIG. 2) that is power driven by a V-belt 122 (also shown in FIG. 3) actuated by a conventional hydraulic drive motor 123 (shown in FIG. 3). The transport V-belts are looped over drive pulley 120 which has a number of V-belts 118. Pulleys 120 and 121 are mounted to a frame member 126 secured to a channel 66 of the box member 70 corresponding to the work stand under consideration. From drive pulley 120 belts 118 are guided in an outward direction away from the center of the implement and are looped over an idler pulley 128 mounted adjacent the outer end of box member 70. From there the V-belts are guided inwardly and over a tensioning pulley 130 mounted to a movable arm 131 of a belt-tensioning device 132. From the tensioning pulley, the belt direction is again reversed and it is now guided in an outward, generally horizontal, direction to and over an idler pulley 134 that is mounted to working stand 22, or the corresponding movable beam 78, 79 so that that pulley moves laterally away and towards the implement with the working stand. From idler pulley 134, the belts are guided in an upward direction over a pair of idler pulleys 136, 137 mounted to the working stand at an elevation from working stand floor 106 so that workers on the stand can conveniently place picked fruit onto the belts. Thus, the V-belts are brought outwardly to adjacent outer side 116 of each stand 22 where workmen can place fruit directly onto the belts without turning, bending, or twisting. Alternatively, the belts can be arranged to run parallel and immediately adjacent outer stand side 116 (not shown) to place the fruit deposit location for the workmen even more conveniently.

Pulleys 136, 137 are arranged so that the inner V-belts 118 are in a common, substantially horizontal plane while the two outer belts are elevated above the inner belts to form a movable trough 138 onto which the picked fruit can be placed for movement to the inclined gathering belt 30. To maintain the V-belts in their trough-shaping positions, a pair of idler pulleys 137a are mounted to frame 126 immediately adjacent drive pulley 120 from where the outer V-belts are returned into alignment with the remaining inner belts.

To operate the horizontal transport belt means 28, drive motor 123 is energized and drive pulley 120 moves endless belts 118 over the idler and tension pulleys at a predetermined speed. The spring-loaded tensioning mechanism 132 maintains the belts taut irrespective of the relative position of working stands 22. When a working stand is retracted, as illustrated on the left-hand side of FIG. 6, belt strand 118a disposed between idler pulleys 136, 137 and drive pulley 120 is relatively short while belt strand 118b between pulleys 128 and 130 is relatively long. Upon movement of the working stand to its outermost position, illustrated on the right-hand side of FIG. 6, the length of belt strand 118a between drive pulley 120 and idler pulleys 136, 137 increase by the distance the working stand moved outwardly. The length of the belt strand 118b, however, between pulleys 128 and 130 decreases by the same amount so that the overall belt length remains the same and the V-belts remain taut irrespective of the working stand position. Convenient use of the belts without need for tensioning, movable weights, or complicated belt takeup mechanisms is thereby assured since all other belt strands between the various pulleys do not change in length during the inward or outward movement of the work stand.

To prevent fruit placed in trough 138 from rolling along the trough in either direction when the implement is disposed on a sloping ground the inner V-belts 118 forming the base of the trough are provided with intermittently spaced upwardly extending barriers 140. The barriers can be integrally constructed with the belt but, to save costs, it is presently preferred that they be constructed of a soft flexible and resilient rubber or a spongelike material such as foam rubber and that they be flexibly bonded to the upper side of the V-belts to permit them to move over and around the pulleys of the drive mechanism.

Fruit placed on and transported to the center of the implement by V-belts 118 is discharged as the belts loop over drive pulley 120 whereby the fruit falls onto inclined gathering belt drive 30. Pulley 120 and the gathering belt are so positioned that the fruit is not damaged by high-impact forces when it contacts the belt.

Referring particularly to FIGS. 2, 6, 8 and 9, inclined gathering belt 30 is suitably mounted between elongate, opposing frames 142 that are secured to upstanding frames 126 which, in turn, are affixed to box members 70 so that the inclined gathering belt is always parallel to bars 58 mounting working stands 22 and the box members. The gathering belt itself comprises a flat, endless and relatively soft belt 144 constructed of reinforced rubber belt or the like, which mounts intermittently spaced transverse brackets 146. The brackets include upwardly extending ends mounting shafts 148 over which resilient, soft sleeves 150, constructed of foam rubber material or the like, are disposed. The sleeves prevent fruit on the inclined gathering belt from rolling downwardly, gathering excessive speed, and becoming damaged or crushed when decelerated. Furthermore, to prevent fruit on flat belt 144 from collecting on one or the other side of the belt when the implement is disposed on sloping ground it is preferred to affix soft and resilient barrier members 152 over the width of the belt to prevent fruit thereon from moving in a transverse direction beyond the limits established by the barriers. Since the barriers move with belt 144 over end rolls 154, the barriers must be constructed of a resilient and deformable material, preferably a soft rubber or foam material, and deformably affixed to the belt as by bonding the barriers thereto.

In operation, all fruit discharged onto the inclined gathering belt 30 is moved downwardly from the respective receiving points on the belt at a speed no greater than the belt speed. An undesired increase in the speed of the fruit or the collection of the fruit on one or the other side of the belt, which can cause jamming, damage the fruit and may require a shutdown of the implement, are prevented by the longitudinal and transverse barrier means 152 and 150, respectively.

The inclined gathering belt can be constructed to receive the fruit discharged by the horizontal V-belts of all working stands 22 (not shown) and discharge the collected fruit directly into a fruit crate. That crate would then be positioned adjacent the forward end of the implement. However, for optimal operation and convenience in the handling of the crates, it is preferred that the crates be filled between the longitudinal center of the implement and its aft end. Fruit from the inclined gathering belt must therefore be transported in an aft direction by horizontal gathering belt 32.

A forward end 156 of the horizontal belt substantially overlaps the forward end of the inclined gathering belt and is secured to frame 18 for pivotal movement of the belt about a horizontal axis located adjacent the forward end of the belt The construction of the horizontal gathering belt is identical to that of the inclined belt illustrated in FIGS. 6, 8 and 9 and is, therefore, not repeated. A hydraulic actuator 159 is provided to pivot the horizontal gathering belt about the horizontal pivot axis for purposes more fully described hereinafter.

Fruit decelerators 34 are placed between the discharge or forward end of the inclined gathering belt and the horizontal gathering belt, and between a discharge end 157 of the horizontal gathering belt and a fruit crate 168 in hold 24 and carried by frame 18 to prevent fruit from falling onto the horizontal belt or into the crate with high speed which would damage the fruit.

Referring now to FIGS. 1 and 10 through 15, fruit decelerators 32 comprise upright, open-ended box members 158 which include means 160 for mounting the box members below discharge end 157 of gathering belt 32. Disposed interiorly of the box member are a plurality of vertically spaced layers 162 of soft and resilient deceleration bars 164. Each layer comprises a plurality of horizontally spaced deceleration bars and the bars in adjacent layers are horizontally offset so that fruit falling between the bars in one layer must contact a bar in the next lower layer to decelerate it and deflect it sideways for passage in a downward direction. Thus, as the fruit moves through the decelerator, it must follow a tortuous path, its maximum speed is controlled by the vertical spacing of the deceleration bar, and fruit damage resulting from the excessive speed of falling fruit is prevented. Furthermore, the deceleration bars are constructed of a material having a surface hardness no greater than about the surface hardness of the fruit so that contact between the two causes compression of the bar instead of the fruit.

In the presently preferred embodiment of the invention, the deceleration bars comprise thick-walled foam rubber tubes which are slipped over elongate spring members such as rubber core bands 166 anchored to the sides of box member 158. This construction of the deceleration bars permits compression of the bars due to the surface softness and resiliency of the foam rubber tube and the elastic deflection of the bars when subjected to dynamic impacts from falling fruit to decelerate the fruit without generating forces that can damage it. In addition, the deflection of the bars due to the flexible core bands 166 permits the passage of relatively large fruit which would otherwise be retained in the decelerator because the core bands allow the bars to vibrate whenever fruit drops onto it. Thus, large fruit can drop between narrowly spaced bars because the bar vibrations permit the large fruit to work itself past the bars under its own weight. Decelerator congestions and possible shutdown of the implement is thereby avoided.

A decelerator 34 is disposed between the lowermost end of inclined gathering belt 30 and the horizontal belt 32 to gently transfer the fruit between the belts and also between the forward, discharge end 157 of horizontal belt 32 and fruit crate 168 disposed in hold 24 and carried by frame 18. The decelerator has a length so that its lower end 170 is closely adjacent crate bottom 172 when gathering belt 32 is substantially horizontally disposed as illustrated in FIG. 10. As fruit is lowered into the crate through the decelerator, fruit level 174 rises steadily so that the decelerator must be slowly raised while the crate is being filled. This, in turn, requires a raising of the discharge end of horizontal gathering belt 32 by pivoting it in a clockwise direction, as viewed in FIG. 1, about the horizontal pivot axis (not separately shown) disposed at the forward end of the belt.

Since the rate with which fruit is discharged into the crate varies with the number of pickers on the implement, their picking speed and the fruit density on the trees, it is not practical to raise decelerator 34 and belt 32 at a predetermined rate because that may result in crushing of the fruit or in an increase of the free-fall distance between lower end 170 of the crate and fruit level 174 which can cause fruit damage. The present invention therefore provides sensor means 176 emitting output signals that actuate a solenoid 178 to energize a hydraulic actuator 180 coupled to horizontal gathering belt 32 to pivot the gathering belt about the horizontal pivot axis (not separately shown) disposed adjacent the forward end of the belt. The sensor means is responsive to a predetermined spacing between the lower decelerator end 170 and fruit level 174. Each time the spacing reaches the predetermined value the discharge end of the belt and the decelerator are raised by an increment so that a controlled spacing between the fruit level and the lower end of the decelerator is at all times maintained.

It is preferred to install a sensor means at least at opposite sides of the decelerator as illustrated in FIG. 10 to assure responsiveness of the sensor even if there is an unequal buildup of the fruit level in the crate. The sensor means preferably comprises a pivot or touch bar 182 having a generally trough shaped lower end 184. The upper end of the pivot bar is secured to one leg of a hinge 186 mounted to an inverted angle 188 or a like structural member secured to the exterior of decelerator 34 so that the pivot bar hangs substantially vertically downwardly from the hinge and lower end 184 is below the lower decelerator end 170. A microswitch 190 is suitably secured to the crate, as by mounting it to a channel 192, and positioned so that its actuator pin 194 is engaged by pivot bar 182 when the bar is freely suspended. Suitable wiring 196 extends from the microswitch to the solenoid, the solenoid and the wiring are arranged so that hydraulic actuator 180 remains deenergized as long as actuator pin 194 is depressed by pivot bar 182. As the fruit level 174 in the crate rises, it eventually contacts lower end 184 of the pivot bar and pivots the bar outwardly as illustrated in the right-hand half of FIG. 11. Microswitch actuator pin 194 is thereby released to energize solenoid 178 and actuate hydraulic actuator 180 to raise gathering belt 32 and decelerator 34 mounted thereto until the pivot bar clears the fruit level and is again freely suspended from hinge 186 (illustrated in FIG. 15), thereby contacting the actuator pin 194 and deenergizing the solenoid. As also shown in FIG. 15, soft padding 198, such as foam material, can be applied to the exterior of pivot bar 182 to prevent possible fruit damage from contact between the fruit and sharp corners of the bar.

After the crate is filled, it must be replaced with a new, empty one during which time no fruit may be discharged by decelerator 34. This can be accomplished by arresting the movement of gathering belts 30, 32, by ceasing the fruit picking during that time interval, both of which alternatives are undesirable, or by providing means 200 for temporarily closing the decelerator and preventing it from discharging any fruit. The closing means provides a frame 202 disposed within box member 158 of the decelerator and a plurality of horizontally spaced decelerator bars 164a affixed to the frame in the above-described manner to form a lowermost layer 162a of decelerator bars. The frame is vertically movably mounted in the box member for movement between an open, lowermost position (illustrated in FIG. 12) and a closed, uppermost position (illustrated in FIG. 13) in which the decelerator bars 164a of the lowermost layer are disposed side by side with decelerator bars 164 of the vertically adjacent layer 162. Thus, when frame 202 is lowered to its FIG. 12 position, a continuous tortuous path is defined through the decelerator from its top opening to its bottom opening. When the frame is raised to its FIG. 13 position, however, the continuous path through the decelerator is interrupted and fruit introduced into the decelerator is stopped by the adjacent decelerator bars 162 and 162a until frame 202 is again lowered.

To enable the at least substantial side by side positioning of the decelerator bars when frame 202 is in its raised position, the frame includes cutouts 204 into which the decelerator bars 164 of the next higher layer can reach. Moreover, the frame includes mounting studs 206 or the like which project outwardly through slots 208 in decelerator box 158 for engagement by lifting cables 210, a suitable lifting mechanism (not shown) or the like. To provide for added guidance of the frame during its up and down motion, elongate guide bearings (not shown) such as vertical tubes engaging guide rods secured to the frame can be provided. The actuation of the closing means can be manual with the help of levers, winches, or the like, or automatically wired suitably mounted motor means. In this manner, fruit can be continuously picked and transported to the decelerator even while fruit crates 168 are being replaced.

The implement is powered by motor 54 which drives a pair of pressure fluid generators 212 that are coupled to a reservoir (not shown) of a hydraulic fluid and a hydraulic accumulator (not shown). The generators provide pressurized hydraulic fluid via controls at control stand 38 for raising and lowering the vertically movable work stands 22; for transversely moving the working stands; for driving gathering belts 30, 32 in a conventional manner; for actuating motors 123 of the horizontal transport belt means 28; for raising and lifting gathering belt 32 and the decelerator 34 attached thereto; for actuating chain drive 48 for the movement of crates 168; and for driving a hydraulic motor 214 coupled with all wheels 20 of the implement via a four-wheel drive mechanism 216 to prevent skidding or slippage of the implement when it moves along soft, slippery or sandy soil conditions as frequently encountered in fruit orchards. To further assure maximum control over the moving vehicle, an otherwise conventional, only schematically shown, four-wheel steering mechanism 218 acts on and steers each of the four wheels 20 to substantially increase the tracking capabilities of the relatively heavy implement even under the most adverse soil conditions.

Summarizing now briefly the operation of the implement, during its storage and transportation, hydraulic actuator 64 is retracted to place bars 58 mounting the vertically movable working stands 22 and inclined gathering belt 30 into a substantially horizontal position as illustrated in phantom line in FIG. 1. Furthermore, piston rods 86 are retracted into cylinders 82 to place working stands 22 into their innermost position as illustrated in FIG. 4. Hydraulic actuators 220 for forward and aft ramps 40, 42 are extended to lift the ramps off the ground. The implement is now ready to move under its own power, or to be placed on a suitable flat bed trailer for the high-speed movement to an orchard. By virtue of the compact construction, the means for lowering the upper working stands and for retracting the working stands, the collapsed vehicle has an overall height of no more than about 8 feet and an overall width of no more than 8 feet. With these dimensions, the vehicle can be loaded on conventional trailers without exceeding normal height and width limitations for movement on public highways. Thus, transportation of the vehicle on highways neither requires special permits nor is it restricted to certain time periods to facilitate the maximum utilization of the implement.

Once at the orchard, hydraulic actuator 64 is energized to raise working stands 22 to their working positions illustrated in FIG. 1, forward ramp 40 is lowered for receiving a crate, and power chain drive is energized to move the crate upward on ramp 40, as guided by guide bars 50, into fold 24 until it is positioned adjacent the rearward end of the implement below decelerator 34 attached to the discharge end 157 of horizontal gathering belt 32. Thereafter, the forward ramp is raised and drive motor is energized to move the implement along adjacent rows of orchard trees. A workman is positioned on each workstand 22 of each side of the vehicle. The vehicle preferably moves continuously, but at a relatively low speed to give the workmen sufficient time to pick all fruit within their reach. The fruit transport means 26, principally comprising the horizontal transport belt means 26 between the working stands, the gathering belts 30, 32 and decelerators 34 move the picked fruit from the working stands to crate 168 disposed in hold 24. As the fruit level in crate 168 rises, sensor means 176 intermittently energizes solenoid 178 to incrementally raise gathering belt 32 and decelerator 34 attached thereto. When the crate is filled, frame 202 of the closing means 200 is lifted to prevent the further discharge of fruit by the decelerator and to enable the replacement of the full crate with an empty one.

The closing of the decelerator can be done automatically in response to a predetermined position of the decelerator or it can be done manually. In the latter instance, it is preferred to provide warning means such as a horn 222 which, in response to a predetermined relative inclination of the horizontal gathering belt, audibly alerts the operator of the vehicle that the crate is filled and must be replaced. The operator can then close the decelerator and actuate power chain drive 48 to discharge the full crate from the hold via aft ramp 42 onto the orchard ground while a new crate is placed in position beneath decelerator 34 attached to gathering belt 32. The filled crates are then collected, loaded onto trucks and hauled off.

I claim:

1. An agricultural implement for use on trees for pruning, trimming, picking fruit and the like comprising a vehicle for movement past the trees, a plurality of pairs of laterally positioned, opposite independent working stands, beam means connected to each stand pair, the beam means for each pair being aligned in a longitudinal direction of the vehicle, extending from the respective stands towards the vehicle and positioning the stands of the pair on opposite sides of the beam means so that one stand faces forward and one stand faces aft on the vehicle, means mounting the beam means to the vehicle for independent relative lateral movement of the stands, means for independently power moving each stand in a direction transverse to the direction of movement of the vehicle, and means for simultaneously changing the relative elevation of at least some of the stands.

2. An implement according to claim 1, wherein the transport means includes substantially horizontally disposed belt means extending from the working stands towards interior portions of the implement for carrying fruit from the stands to such portions, and means positioning the belt means above a workman supporting surface of the stands to facilitate placement of fruit on the belt means.

3. An implement according to claim 1, wherein the vehicle includes means for carrying a crate; and further including power driven means originating at the stands and terminating at the crate for transporting picked fruit to the crate, a gathering belt having an end discharging fruit into the crate, means for raising and lowering the discharge end, and transfer means disposed between the discharge end and the fruit in the crate limiting the speed of fruit between the discharge end and the crate sufficiently to prevent damage to the fruit.

4. An implement according to claim 3, including means for sensing the fruit level in the crate, and means for adjusting the position of the transfer means in accordance with the fruit level to permit the filling of the crate without damaging the fruit.

5. An implement according to claim 3, including means for closing the transfer means to temporarily prevent the discharge of fruit by the transfer means.

6. Apparatus for work on orchard trees comprising a movable frame including means for supporting a crate, a plurality of working stands disposed laterally of the frame, a plurality of power-driven lateral fruit transport means moving fruit from the working stands towards a central portion of the frame the transport means comprising a plurality of substantially horizontally disposed, side-by-side, independent, power-driven belts forming a fruit-receiving, movable trough between each working stand and the central portion, and including barrier means intermittently spaced over the length of the belt substantially preventing rolling motion of the fruit in the longitudinal direction of the troughs, and centrally disposed gathering means positioned to receive fruit discharged by the transport means and deposited the fruit in the crate, the gathering means including driven belt means moving the fruit to the crate, and means disposed between the transport means and the crate preventing the fruit from attaining a sufficient speed to cause fruit damage when subjected to relatively sudden deceleration.

7. Apparatus according to claim 6, and means cooperating with the belt means to prevent substantial relative movements of the fruit on the belt means in a direction transverse to the length of the belt means.

8. Apparatus according to claim 6, including means responsive to the fruit level in the crate for actuating the decelerator raising and lowering means and maintaining a substantially constant spacing between a lower end of the decelerator and the fruit level in the crate.

9. Apparatus according to claim 8, wherein the decelerator means includes a plurality of substantially horizontally disposed deceleration bars, the bars being arranged in vertically stacked layers and positioned to guide fruit in an irregular, nonlinear path through the decelerator means, and wherein the apparatus further includes means for changing the vertical position of a bar layer with respect to another bar layer for selectively opening and closing the path for the fruit through the decelerator.

10. Apparatus according to claim 9, including power-driven means for moving the crate from one end to another end of the frame.

11. Apparatus according to claim 6, therein the working stands comprise independent work platforms, and means for laterally and substantially horizontally moving the platforms towards and away from the frame, the moving means including means for movably interconnecting the platform and the frame, and wherein the apparatus further includes rotatable pulleys mounting the horizontally disposed fruit transporting belts positioning the pulleys so that the belts are maintained taut irrespective of the relative lateral position of the work platform.

12. Apparatus according to claim 11, wherein the transport means comprise a plurality of relatively narrow belts for each working stand, each belt being arranged in an endless loop, and including pulleys between the working stand and the discharge end of the transport belt positioning the plurality of belts with respect to each other so that the belts define a fruit-receiving, movable trough.

13. Apparatus according to claim 6, wherein the transport means comprises a plurality of spaced-apart, endless power-driven belts, a belt portion intermediate the working stands and the gathering means being substantially horizontally disposed, and wherein a fruit-receiving end of the belt portion is closely adjacent an outermost end of the working stands.

14. A pruning and picking apparatus for positioning workmen at various elevations adjacent orchard trees comprising a movable frame adapted to move along rows of orchard trees, a plurality of work platforms disposed on each side of the frame and staggered in the direction of movement of the frame, the platforms being relatively narrow in the direction of their lateral movement to permit the platforms to enter interior portions of the trees past major tree limbs, the platforms further being movable laterally of the direction of movement of the frame towards and away from the frame, hydraulic actuator means for independently varying the relative lateral position of each work platform, means for raising and lowering at least some of the platforms and power-driven transport means for moving fruit picked at the platforms to a crate supported by the frame, the apparatus having an overall height of no more than about 8 feet and an overall width of no more than about 8 feet when the platforms are fully retracted and in their lowermost position.

* * * * *